US008320659B2

(12) United States Patent
Song et al.

(10) Patent No.: US 8,320,659 B2
(45) Date of Patent: Nov. 27, 2012

(54) METHOD FOR CUSTOMS INSPECTION OF BAGGAGE AND CARGO

(75) Inventors: Samuel Moon-Ho Song, Las Vegas, NV (US); Douglas Perry Boyd, Las Vegas, NV (US)

(73) Assignee: TeleSecurity Sciences, Inc., Las Vegas, NV (US)

( * ) Notice: Subject to any disclaimer, the term of this patent is extended or adjusted under 35 U.S.C. 154(b) by 1045 days.

(21) Appl. No.: 11/888,481

(22) Filed: Aug. 1, 2007

(65) Prior Publication Data
US 2009/0034790 A1 Feb. 5, 2009

(51) Int. Cl.
*G06K 9/00* (2006.01)
*G01N 23/00* (2006.01)
*G01N 23/02* (2006.01)

(52) U.S. Cl. ........ 382/143; 382/103; 382/131; 382/132; 382/141; 382/181; 382/203; 382/209; 378/10; 378/57

(58) Field of Classification Search .......... 382/143, 382/103, 131, 141, 181, 203, 209, 132; 378/10, 378/11, 13, 57
See application file for complete search history.

(56) References Cited

U.S. PATENT DOCUMENTS

| | | | | | |
|---|---|---|---|---|---|
| 4,590,558 | A | * | 5/1986 | Glover et al. | 378/6 |
| 5,796,802 | A | * | 8/1998 | Gordon | 378/8 |
| 6,317,509 | B1 | * | 11/2001 | Simanovsky et al. | 382/131 |
| 6,807,458 | B2 | * | 10/2004 | Quackenbush et al. | 700/213 |
| 7,139,406 | B2 | * | 11/2006 | McClelland et al. | 382/100 |
| 7,356,174 | B2 | * | 4/2008 | Leue et al. | 382/131 |
| 7,813,540 | B1 | * | 10/2010 | Kraft | 382/143 |
| 2002/0198731 | A1 | * | 12/2002 | Barnes et al. | 705/1 |
| 2005/0031076 | A1 | * | 2/2005 | McClelland et al. | 378/57 |
| 2005/0111618 | A1 | * | 5/2005 | Sommer et al. | 378/57 |
| 2006/0109949 | A1 | * | 5/2006 | Tkaczyk et al. | 378/4 |
| 2006/0273257 | A1 | * | 12/2006 | Roos et al. | 250/358.1 |
| 2006/0274916 | A1 | * | 12/2006 | Chan et al. | 382/100 |
| 2007/0003122 | A1 | * | 1/2007 | Sirohey et al. | 382/131 |
| 2007/0118399 | A1 | * | 5/2007 | Avinash et al. | 705/2 |
| 2008/0118021 | A1 | * | 5/2008 | Dutta et al. | 378/4 |
| 2008/0152082 | A1 | * | 6/2008 | Bouchard et al. | 378/57 |
| 2008/0253653 | A1 | * | 10/2008 | Gable | 382/173 |

OTHER PUBLICATIONS

Brown, Douglas R. "Advanced Technology for Marine Cargo Security." 7th Marine Transportation System Research & Technology Coordination Conference. The National Academy of Sciences. Washington DC. Nov. 17, 2004.*
Paolo Sabella; "A Rendering Algorithm for Visualizing 3D Scalar Fields", ACM 0-89791-275-6/88/008/0051, 1988, pp. 51-58.
Chin-Feng Lin, Don-Lin Yang, and Yeh-Ching Chung; "A Marching Voxels of Method for Surface Rendering of Volume Data", Department of Information Engineering, IEEE, 2001, pp. 306-313.
Kelly Leone and R. Liu, "Validating Throughput analysis of Checked Baggage Screening Performance", Jul. 2004, pp. 1-17.

(Continued)

*Primary Examiner* — Michael A Newman
(74) *Attorney, Agent, or Firm* — Phillip A. Shipley; The Small Patent Law Group

(57) ABSTRACT

A method and system of inspecting baggage to be transported from a location of origin to a destination is provided that includes generating scan data representative of a piece of baggage while the baggage is at the location of origin, and storing the scan data in a database. A rendered view representative of a content of the baggage is provided where the rendered views are based on the scan data retrieved from the database over a network. The rendered views are presented at a destination different from the origin.

36 Claims, 8 Drawing Sheets

OTHER PUBLICATIONS

Jayaram K. Udupa and Hsui-Mei Hung, "Surface Versus Volume Rendering: A comparative Assessment", IEEE, 1990, pp. 83-91.

Yi Sun, "Performance Analysis of Maximum Intensity Projection Algorithm for Display of MRA Images", IEEE, vol. 18, No. 12, Dec. 1999, pp. 1154-1169.

Sameer Singh and Maneesha Singh, Explosives detection systems (EDS) for aviation security, Signal Processing 83, pp. 31-55.

Sally L. Wood, "Visualization and Modeling of 3-D Structures", IEEE Engineering in Medicine and Biology, Jun. 1992, pp. 72-79.

Ulf Tiede, Karl Heinz Hoehne, Michael Bomans, Andreas Pummert, Martin Riemer, and Gunnar Wiebecke; "Surface Rendering: Investigation of Medical 3D-Rendering Algorithms", Mar. 1990.

Marc Levoy; "Volume Rendering: Display of Surfaces from Volume Data", IEEE May 1988, pp. 29-37.

Steven Schreiner; "A Fast Maximum-Intensity Projection Algorithm for Generating Magnetic Resonance Angiograms", IEEE 1993, 0278-0063/93, pp. 50-57.

* cited by examiner

METHOD FOR CUSTOMS INSPECTION OF BAGGAGE AND CARGO

BACKGROUND OF THE INVENTION

Certain embodiments generally relate to methods and systems for providing remote access to baggage scanned images and passenger security information on a global level.

In recent years there has been increasing interest in the use of imaging devices at airports to improve security. Today thousands of computed tomography (CT) scanners are installed at airports to scan checked baggage. The CT scanners generate data sets that are used to form images representative of each scanned bag. The data sets are currently processed by an automated image recognition system, such as for certain patterns, characteristics and the like. When the image recognition system identifies a potential threat, the images are brought to the attention of a local operator, for example, who is located at the port of origin of an airline flight.

The CT scanners, better known as explosive detection systems (EDS) are capable of producing fully 3-dimensional (3-D) images. However, the software required to view such 3-D images is complex and generally requires sophisticated local operators with expertise in 3-D rendering software tools. CT scanners are able to generate a 3-D voxel data set that represents the volume of the scanned bag. Conventionally, scanners provide 3-D images by stacking a series of closely spaced cross section images into a 3-D matrix. The 3-D image may then be viewed by a local operator/screener. The local operator at the airport terminal usually steps through two-dimensional (2-D) slices (e.g., planes) of the 3-D matrix to detect and identify potential threats within the packed bag.

Currently, existing CT based EDS are deployed at airports to detect various threats within packed bags. The suspicious bags are passed onto a human screener who examines individual CT slice images of the scanned bag. The CT slice images of alarmed bags are carefully examined by the human screener who then either accepts or redirects the bag for explosive trace detection (ETD) and/or manual unpacking for a visual inspection. This two step process allows approximately 250 bags per hour to be examined with a false-alarm rate of about 20-30%. Currently, one in five bags must be further inspected by carefully reviewing CT slice images.

After the baggage is check-in, the baggage is scanned by a CT scanner and axial slices or images are created of the baggage. The local operator/screener views the axial slices or images by scrolling through each image slice one by one to determine if any potential threats are present in an image. Scrolling through over dozens of images (or even more for future generation scanners) for each bag is a laborious task, and the local operator/screener must be alert to detect features of any potential threats within an image in order to flag the possible threats. Examination of each axial slice image gives rise to operator/screener fatigue that eventually will lead to sub-optimal performance by the operator causing him/her to miss some threats. After a bag is checked, a CT 3-D data set of a packed bag is obtained and may, for example, include hundreds of axial slice images. Of these images only a few images may show the potential threat. If the local operator misses anyone of these few images, the undetected threats could result in disaster either while a plane, train, ship, or cargo vessel is in transit or upon arrival at the destination. Customs officials in a destination country must wait until the arrival of the carrier to search the baggage or cargo, either manually or using a scanner, for contraband or any threatening objects.

There is a need for an improved baggage scanning system and method to allow a customs agent in a foreign country to be able to screen baggage or cargo while the baggage/cargo is in transit before arriving in the destination country. The customs agent needs to be able to perform an inspection of the baggage/cargo for contraband before the illegal material arrives in the country. Thus, the need exists for the customs agent to be able to electronically unpack the scanned baggage/cargo to inspect views of the inside of the packed baggage/cargo while in transit without having to physically unpack the baggage/cargo upon arrival.

BRIEF DESCRIPTION OF THE INVENTION

In accordance with certain embodiments, a method is provided for inspecting baggage to be transported from a location of origin to a destination. The method includes generating scan data representative of a piece of baggage while the baggage is at the location of origin, and storing the scan data in a database. The method further provides rendering a rendered view representative of a content of the baggage where the rendered views are based on the scan data retrieved from the database over a network. The rendered views, whether generated at the point of origin, while en route, or at a destination port, are presented to customs officials at the destination.

According to another embodiment, a system for inspecting baggage transported from a location of origin to a destination is provided. The system includes a database to store scan data acquired while scanning a piece of baggage while the baggage is at the location of origin, a network configured to transmit the scan data, and a workstation for producing a rendered view of the content of the piece of baggage at a destination.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

In the following detailed description, reference is made to the accompanying drawings which form a part hereof, and in which is shown by way of illustration specific embodiments in which the present invention may be practiced. It is to be understood that the embodiments may be combined, or that other embodiments may be utilized and that structural, logical and electrical changes may be made without departing from the scope of the various embodiments of the present invention. The following detailed description is, therefore, not to be taken in a limiting sense, and the scope of the present invention is defined by the appended claims and their equivalents.

In this document, the terms "a" or "an" are used, to include one or more than one. In this document, the term "or" is used to refer to a nonexclusive or, unless otherwise indicated. Also as used herein, the phrase "an image" is not intended to exclude embodiments of the present invention in which data representing an image is generated, but a viewable image is not generated. Therefore, as used herein, the term "image" broadly refers to both viewable images and data representing a viewable image. However, many embodiments generate (or are configured to generate) at least one viewable image.

A customs inspection system is provided to allow for inspection of passenger baggage or cargo shipment while the baggage/cargo is in transit (e.g., by airplane, train, or ship) prior to arrival at a destination. A customs or other official accesses a database containing raw scan data of three-dimensional (3D) views of electronically unpacked baggage/cargo to determine if any illegal substances/objects (e.g., contraband or threatening materials) are being smuggled while the baggage/cargo is en route to a destination port. An electronic unpacking process simulates physical unpacking of the packed bags in order for the customs official to visualize various objects within the bag, where the objects may represent threats.

Figure 1:
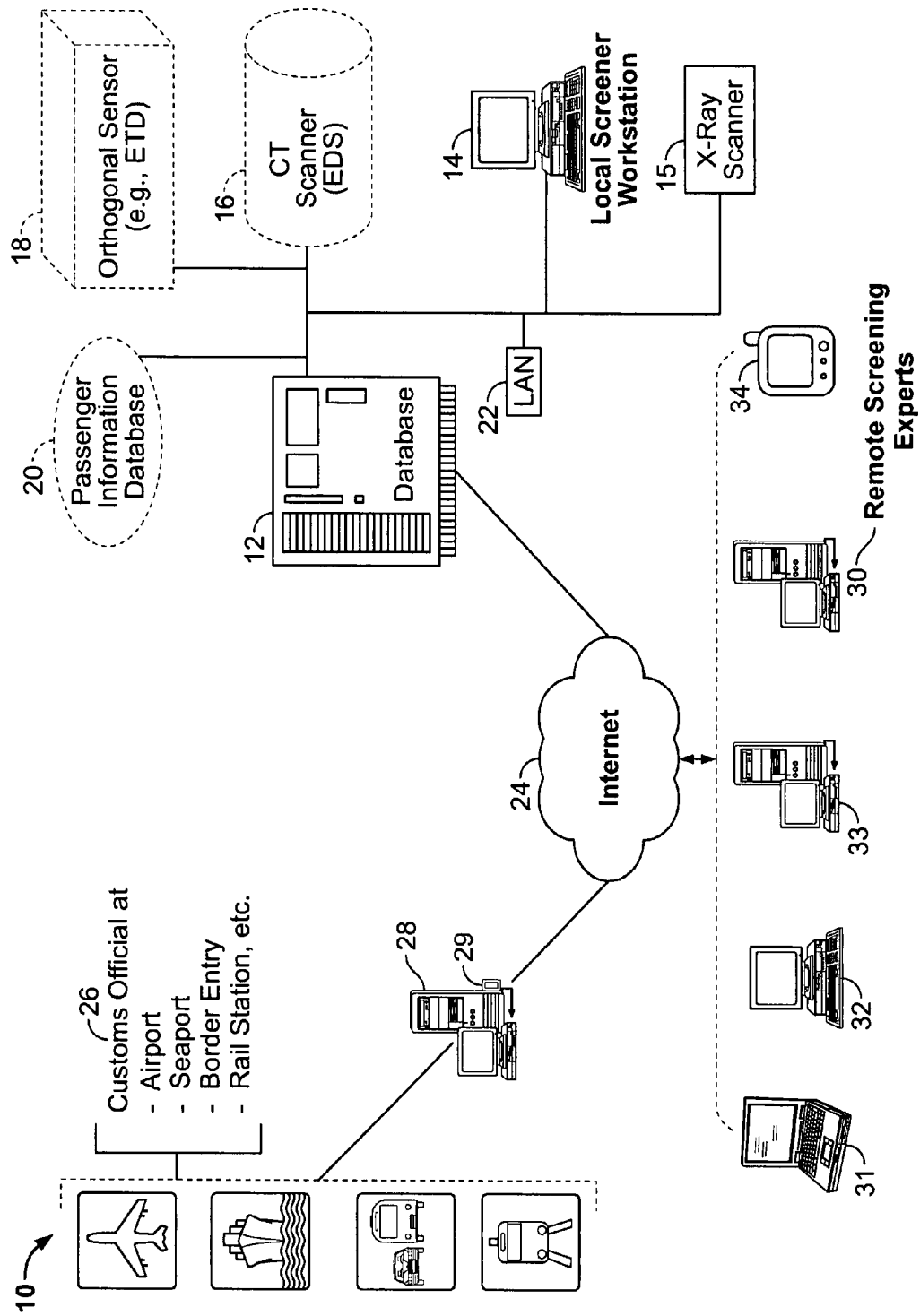
FIG. 1 illustrates a block diagram of a customs inspection system for baggage and cargo formed in accordance with an embodiment of the invention.

FIG. 1 illustrates a block diagram of a customs inspection system 10 for baggage and cargo formed in accordance with an embodiment of the invention. The system 10 includes a database 12, a workstation 14, an x-ray scanner 15, a CT scanner 16, an orthogonal sensor 18, and a passenger information database 20 that are interconnected together by a local area network 22 (e.g., LAN). When a passenger enters, for example, an airport to board an airplane, the passenger's baggage and carry-on belongings are scanned during a check-in process. The CT scanner 16 and x-ray scanner 15 scan the checked baggage and carry-on baggage, respectively. Orthogonal sensors 18 are used to measure different characteristics of objects contained within the baggage to determine the presence of any threats (e.g., explosives, guns, knifes, and the like). The CT scanner 16 may include a moving source and moving detector. The x-ray scanner 15 may include a stationary source and stationary detector that operate as a line scanner. The CT and x-ray scanners 15 and 16 generate scan data representative of the scanned baggage. The CT scanner 16 may be used to scan checked baggage and/or carry-on baggage. Similarly, the x-ray scanner 15 may be used to scan checked baggage and/or carry-on baggage. The scan data may represent a simple projection view from a fixed, known scan angle (such as with a stationary source and detector). Optionally, the scan data may represent a series of projection views from multiple scan angles about a z-axis (such as with a rotating source and detector). When the scan data represents a series of projection views, the scan data may be used to reconstruct a volumetric data set, from which rendered views are produced.

The acquired raw scan data, volumetric data set and/or rendered views are stored in the database 12 via a high-speed connection, such as the LAN 22. When the scan data corresponds to one projection view, the projection view may also be stored in the data base 12. Passenger information from the passenger information database 20 is linked or indexed to the stored scan data to associate a particular passenger with the scan data of the passenger's luggage and belongings. The database 12 is connected to a network 24. The network 24 may represent the internet, a private network, a high-speed network, an intranet, a local area network (LAN), a wide area network (WAN), a peer-to-peer network, a client/server network, metropolitan area network (MAN) and the like to provide access to database 12.

A customs official 26 may be located, for example, at an airport, a seaport, a border entry post, a rail station 34, and the like. The customs official 26 accesses the database 12 via a workstation 28 and the network 24 to inspect the baggage and cargo aboard an air plane. There may be multiple workstations 28, for use by customs officials 26, located in multiple countries. The workstations 28 have network interfaces 29 to simultaneously access the database 12 via the network 24. The workstations 28 acquires scan data from database 12, produces image views therefrom and performs electronic unpacking while the plane, boat, train and the like is inbound to a destination. Typically, during electronic unpacking, one piece of baggage is divided into hundreds of slices or images. Electronic unpacking utilizes a stored scan data set to electronically unpack the same identical bag by performing a slice-by-slice processing. The electronic unpacking is superior to manual unpacking because the electronic unpacking can identify whether various objects within the bag are innocuous or not, based on the Hounsfield Unit (HU). Moreover, electronic unpacking can determine the exact volume of all objects, both threats and innocuous, as well as contraband objects, within the packed bag. The unpacking process may be used to visualize organic material (e.g., typical bombs, explosives or biological weapons) or metals (e.g., guns, knifes, and the like) for detection of certain threats while unpacking the bag.

In addition, a customs official 26 when examining projection or rendered views, on the workstation 28 of objects within the baggage, may contact remote screening experts 30 to determine if an object is a threat. The customs official 26 and one or more remote experts 30 with access to the network 24 are able to examine the projection and rendered views simultaneously and discuss whether an object is a threat or not a threat. The remote screening experts 30 may utilize a variety of modes to view the rendered views, for example, a laptop 31, a desktop 32, a workstation 33, a personal digital assistant/cell phone 34, and the like.

Figure 2:
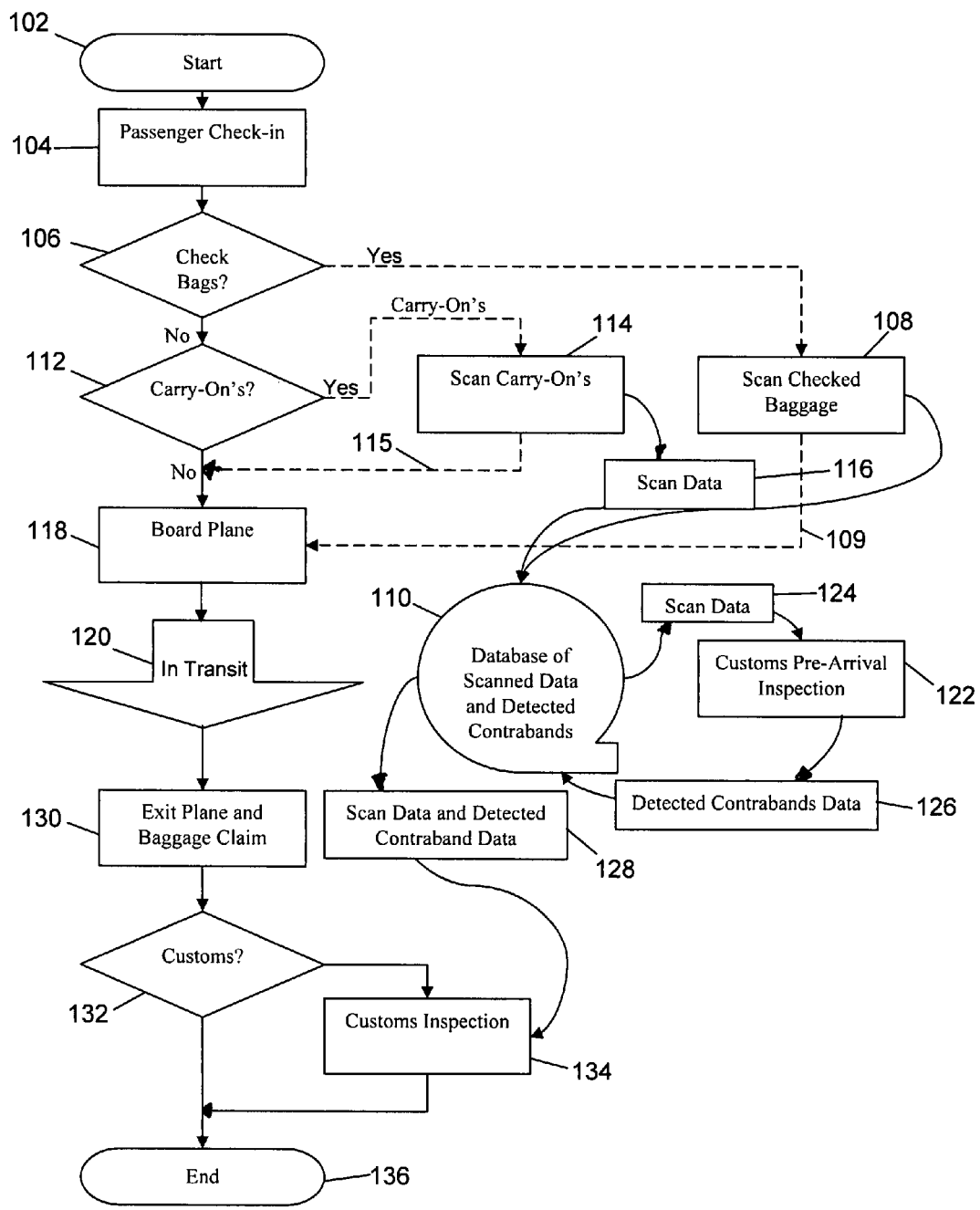
FIG. 2 illustrates a flow diagram of a customs official using electronic unpacking in accordance with an embodiment of the invention.

FIG. 2 illustrates a process 100 that allows a customs official 26 to perform an inspection of the baggage/cargo while in transit in accordance with an embodiment of the invention. Process 100 illustrates a typical passenger having checked luggage and carry-on belongings when boarding a plane to a particular destination. However, the process 100 may be implemented for any mode of transportation in addition to an airplane, for instance, a ship, a train, a bus, and the like. In addition, the process 100 may be used for any type of cargo to be transported/shipped to another location by air, freight, or ship, and the like. At 102, the process 100 begins when a passenger arrives with baggage at a point of departure (e.g., an airport terminal). At 104, the passenger checks-in with the carrier (e.g., airline, ship, or train), receives his/her ticket confirmation and proceeds to a security area for screening.

At 106, the checked luggage is placed on a conveyor bet and transferred to a secure area to be scanned. At 108, a scanning device 16 (e.g., such as a CT scanner, a cine computed tomography scanner, a helical CT scanner, a four-dimensional (4D) cine computed tomography scanner, an electronic beam scanner, an X-ray scanner, a dual-energy x-ray scanner, dual-energy CT scanner, and the like) scans the checked-baggage (e.g., luggage, suitcases, backpacks, boxes, crates, briefcases, and the like) or cargo to obtain a volumetric data set representative of every voxel within the object of interest. Each scanning device 16 includes a scanner source and detector that are capable of obtaining a volumetric (or a cross-sectional) scan of each item of interest, a controller module to control operation of the scanner device 16, a user interface to afford operator control, and a monitor to display images obtained by the scanner 16. For example, the scanner and detector may rotate about the baggage as the baggage is conveyed along a belt (e.g., to perform a helical scan). After the checked-baggage is scanned, the baggage is loaded onto the airplane (following the flow at 109).

At 110, the raw scan data (e.g., the 3D volumetric data set for each piece of baggage) generated by the scanning device 16 is stored in real-time to a database 12. The term "real-time" as used through out this document shall include the time period while the object being scanned is still within the scanner device 16, and shall also include a period of time immediately after the object exits the scanning device 16. For example, "real-time" would include the time from when a bag is checked, the time in which the bag is transported to the flight, the time in flight, and the time in which the bag is transported from the flight to the bag retrieval area at the destination airport.

The scan data is downloaded from the scanning device 16 to be stored in the database 12 in one of several image formats, for example, DICONDE, TIFF, JPEG, PDF, and the like. Each image file is assigned a header that identifies which scanning device 16 produced the image, the time of the scan, the passenger ID, and other data obtained at the point of scan. The image files may be stored for forty-eight (48) hours or more. Optionally, the scanning device 16 may produce rendered views that are pre-sorted and stored as a sequence of images in the database 12. The scan data may also be combined in data sets that are compressed and encrypted prior to storage in the database 12. Compressed and encrypted data sets are conveyed over a high-speed connection 24 with standard internet transport protocols to a requesting terminal/server or workstation 28.

In an embodiment, the database 12 is connected to a plurality of terminal/servers 14, processors 32 or workstations 28 over a high-speed connection 24 (e.g., electronic network, a private network, a LAN, internet and the like) to display a rendered view. The other workstations 28 may be co-located in the same terminal building, different buildings in the same general geographic area, as well as multiple locations within a country or multiple locations outside the country. Therefore, multiple terminal/servers or workstations 28 located at multiple locations may simultaneously download raw scan data stored in the database 12 and perform electronic unpacking and threat detection in accordance with various techniques described thereafter.

At 112, the passenger is in the security area and the passenger's carry-on baggage (e.g., purse, wallet, coat, jacket, shoes, back packs, baby strollers, briefcases, laptops, personal digital assistants, cell phones, and the like) that are being carried onto the plane (or a train, a bus, a ship and the like) are placed onto a conveyor belt within a container for scanning by the x-ray scanner 15 prior to passenger boarding.

At 118, if the passenger has non carry-on belongings, he/she may proceed to board the plane.

At 114, the carry-on items are scanned by the x-ray scanner 15 and/or a 2D projection data set or to obtain volumetric 3-D data set (e.g., scan data) representative of the baggage. At 116, the scan data of the carry-on baggage are stored in the database 12. The scanner 15 or 16 is connected to a local terminal/server or workstation 14 having a display that shows projection or rendered images to a local screener to examine for any threats. If a threat is detected, the items may be confiscated and the passenger may be prevented from boarding. However, if the scan of the carry-on baggage does not identify any threats, the baggage is returned to the passenger and process 100 continues by following flow 115 to 118.

At 120, while the plane is in transit, customs officials 26 located in other countries are able to access the database 12 via a high-speed connection 24 to download scan data to perform a pre-arrival inspection. The high-speed connection 24 is a private communications link. One aspect of the pre-arrival inspection is to perform electronic unpacking of the baggage/cargo that is in transit by accessing the database 12 to download the raw data and then analyze the raw scan data using a terminal/server or workstation 28 that utilizes electronic unpacking to generate rendered views. The customs official has access to all relevant passenger information, as well as the baggage content (both checked and carry-on).

At 122, an electronic unpacking process (described in FIG. 3) is performed to generate a three-dimensional (3D) data set of the packed bag or cargo utilizing, for example, the raw scan data of the baggage/cargo stored in the database 12. Typically, one piece of baggage is divided into hundreds of slices or images. Electronic unpacking utilizes the stored CT raw data set to electronically unpack the same identical bag by performing a slice-by-slice processing. First, the 3D computed tomography data may be interpolated to generate isotropic volume data. Just as there are many ways to unpack real physical bags, electronic unpacking offers a number of different visualization techniques/algorithms to visualize the objects within the packed bags. For instance, the bag may be electronically unpacked in 3D using surface rendering (SR), volume rendering (VR), maximum intensity projection (MIP), or a combination thereof. The electronic unpacking is superior to manual unpacking because the electronic unpacking can identify whether various objects within the bag are innocuous or not, based on the Hounsfield Unit (HU). Moreover, electronic unpacking can determine the exact volume of all objects, both threats and innocuous, within the packed bag. The unpacking process may be used to visualize organic material (e.g., typical bombs) or metals (e.g., guns, knifes, and the like) for detection of certain threats while unpacking the bag.

Optionally, a 3D threat detection algorithm may be provided to detect possible threats. The electronic unpacking and threat detection enhance both the threat detection accuracy and the image quality of the electronically unpacked bag. The bags that are automatically flagged by the threat detection algorithm are sent, along with images of the electronically unpacked bag clearly marked with threats or contrabands, to the database 12 for the customs official's review. In addition, the rendered images marked to show the threats or contrabands may be sent via a high-speed connection 24 to a local terminal/server or workstation 28 to be displayed to the customs official 26.

The terminal/server 28 includes a user interface and a display (not shown) that shows multiple views of an object. For instance, the display may contain multiple windows that show at least one of a three-dimensional (3D) rendering, a two-dimensional (2D) view, a cut plane, and a magnified view. The workstation 28 has the ability to display various angles, perspectives, rotations, magnifications of an object. In addition, the user interface may allow a customs official 26 to utilize a drawing function to trace, to sketch, or to outline around the area of interest. The customs official 26 also has the capability to toggle-on and toggle-off various portions of the display portions. If a display portion is not shown, the remaining portion may be re-sized and/or rotated. For example, the object displayed in any of the windows can be rotated about at least two axes, typically a vertical axis and one or both horizontal axes. The user interface allows the customs official 26 to measure at the workstation 28 a plurality of distances and save each distance in memory. The distances may include a length, a diameter, a radius, and the like. The distances can be utilized to determine a volume of an object. Further, user interface provides a variety of markers for the user to identify potential areas of interest, cut-out specific sections or cut-out specific portions of an object, and to identify threats and contraband.

In accordance with certain embodiments, the electronic unpacking process seamlessly integrates with both the currently deployed and future generation computed tomography (CT) scanners 16 as well as current and future generation explosives detection systems (EDS), while allowing a desired allocation of expert screening 30 capabilities and remote monitoring of the inspection process itself. The electronic unpacking process integrates the EDS at all installations (e.g., airports, seaports, buses, trains, and the like) and permits screeners 14, 28, and 30 (e.g., local screeners, experts, customs officials and the like) to view the images via a secure network. The electronic unpacking process also integrates other orthogonal sensors 18 (e.g., ETD) and the passenger information database 20.

The electronic unpacking process may provide an expert-on-demand (EoD) service, through which, the customs official 26 has instant access to remote screening experts 30 located anywhere in the world. Therefore, upon review of the 3D electronically unpacked bag images, the customs official 26 has the option to either accept the bag or request consultation with one or more remote screening experts 30 using an expert-on-demand (EoD) service if the customs official 26 has any questions as to whether the rendered image depicts threats or contraband. The electronic unpacking process allows remote experts 30 to be off-site anywhere in the world. A remote expert 30, thus, may be off-site with a laptop computer 31, at home with a PC 32 or on the road with a PDA 34. The electronic unpacking process supports transmitting text, voice, video, white board, and the like. Various passenger information data, such as passenger itinerary, travel history, credit information, passenger profile, passport information, passenger photograph, family history, age, physical characteristics, job information and the like are also available for review to assist in the decision whether the rendered image depicts a possible threat. Communication between the customs official 26 and the remote expert 30 is similar to public domain messenger services such as MSN®, AOL® and Yahoo® messengers. However, the electronic unpacking process is specially developed for security applications with careful considerations of airport inspection process and EDS requirements. Therefore, users or public messenger services are unable to establish a link with expert screeners 30.

A customs official 26 upon scrolling through slices of the 3D data set would initially examine separate CT slices and decide whether a threat is present or not. At 126, any contraband the customs official 26 detected would be marked as such and stored in the database 12.

If the electronic unpacking process determines any organic material (e.g., typical bombs), illegal metal objects (e.g., guns, knifes, and the like) or detects any contraband while unpacking the bag, the passenger information database 20 is accessed to determine the owner of the baggage. The owner of the baggage and all the baggage are then placed on a list for a manual inspection when the plane arrives.

At 128, while the aircraft is in transit but near arrival to the destination, the scan data associated with the baggage and cargo, as well as, any identified threats/contraband are accessed from the database 12.

At 130, the plane arrives at the destination and the passengers exit the plane with their carry-on items and the checked baggage is removed from the airplane and placed on a conveyor belt to be transferred to inside an airport terminal.

At 132, the passenger enters a customs inspection area with their carry-on bags and checked luggage. If a passenger has been selected for inspection, the process continues to 134. However, if a passenger has not been selected for inspection because no illegal substances and no threats have been identified during electronic unpacking, the passenger may take the baggage and exit the customs area.

At 134, a customs official 26 has on a display screen of the workstation 28 the rendered views of all the checked luggage belong to the passenger that has been identified to contain a threat or illegal contraband. A manual inspection of the baggage is performed, taking into account the location of the illegal contraband or threat inside the baggage based on the rendered views. The illegal contraband may be confiscated and the passenger may be detained per the laws of the local jurisdiction. At 136, the process terminates.

Figure 3:
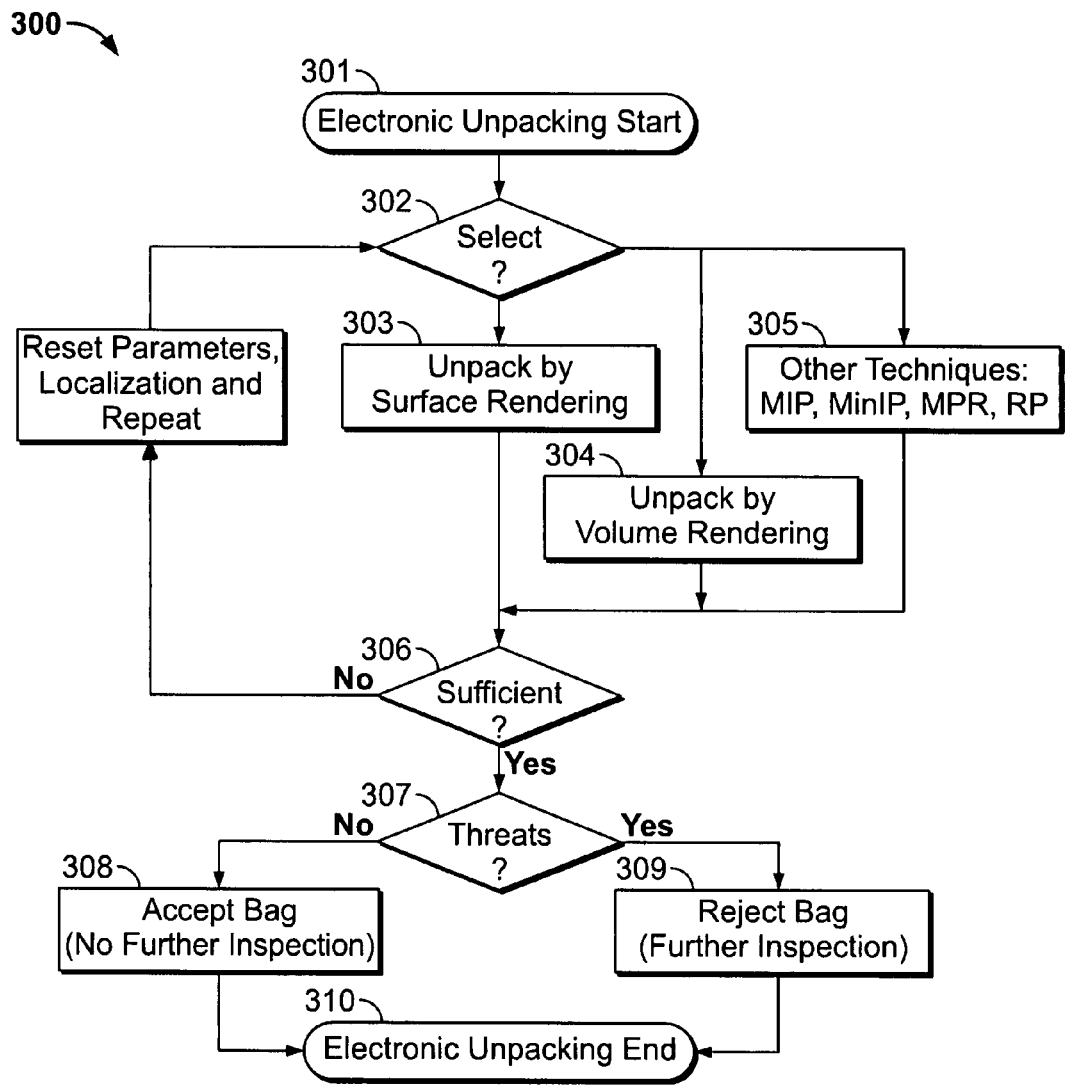
FIG. 3 illustrates a flow chart for an exemplary sequence of operations carried out by a scanner to electronically unpack a piece of baggage performed in accordance with an embodiment of the invention.

FIG. 3 illustrates a flow diagram 300 depicting the process of electronically unpacking a bag. Prior to unpacking, a CT scanner scans a piece of baggage for a scannable characteristic to acquire scan data representative of a content of the piece of baggage, wherein the scannable characteristic is an attenuation measured. The electronic unpacking process and system maybe implemented in accordance with the techniques described in the present inventor's co-pending patent application titled "Method and Systems for Electronic Unpacking of Baggage and Cargo," Ser. No. 11/702,794, filed on Feb. 5, 2007, the complete subject matter of which is incorporated by reference in its entirety herein. The scan data is stored in the database 12. The scan data provides axial slices (or z-slices) with isotropic pixels. A volumetric data set is generated from the scan data, where the volumetric data set includes voxel values that are in Hounsfield units, for the scannable characteristic throughout a volume of interest in the piece of baggage. A portion of the volumetric data set is segmented based on the voxel values to identify an object and provide a visual marker outlining the object. The voxel values are segmented into categories. The categories are selected by the Hounsfield unit value of the voxel, and the categories being an innocuous material, an organic material and a metallic material.

At 302, depending on the type of bag and/or the screener's preference, a visualization technique is selected. A variety of visualization techniques may be utilized to render the isotropic volume data in 3-D. Furthermore, the visualization technique may be selected automatically depending on the size of the bag and the density distribution of objects inside the bag. Depending on which visualization technique selected by the customs official 26, the electronic unpacking renders the scanned bag data using surface rendering (SR) 303, volume rendering (VR) 304, or maximum intensity projection (MIP) 305. Alternatively, minimum intensity projection (MinIP), multi-planar reformatting (MPR), or radiographic projection (RP) may also be utilized in place of MIP to visualize the 3-D results. The selected visualization technique produces a rendered view of the content of the piece of baggage based on voxel values within a selected range from the volumetric data set. The rendered view is produced from voxel values that lie within the customs official 26 selected range of thresholds of a selectable range of voxel values wherein the customs official 26 has the ability to interactively adjust the selectable range.

Surface Rendering (SR) 303 is a visualization that is utilized to unpack a bag to show the exterior surface of objects within the packed bag. But, before the actual visualization step occurs, SR 303 requires the volume data to be preprocessed (e.g., a surface extraction is performed to determine the exterior surface of an object). In general, surface boundary voxels are determined using a threshold value from the isotropic volume data. Then a marching cube algorithm or a marching voxel algorithm is applied to the surface boundary voxels, which provides the surface data of the object.

After surface extraction, the object is rendered in 3-D using a light source and a reflection resulting from the light source. There are three types of reflection, (e.g., diffuse, specular, and ambient reflections), and an object is represented by the sum of the diffuse, specular, and ambient reflections. SR 303 handles only surface data of the object after surface extraction, so the surface rendering speed is higher than the other visualization techniques. SR 303 is very good for various texture effects, but SR 303 needs preprocessing of volume data such as surface extraction. Therefore, SR 303 is not suitable for thin and detailed objects as well as that object that have a transparent effect.

On the other hand, Volume Rendering (VR) 304 is a visualization technique that uses volume data directly without preprocessing of the volume data, such as required by surface extraction in SR 303. A characteristic aspect of VR 304 is opacity and color that are determined from the voxel intensities and threshold values. The opacity can have a value between zero and unity, so the opacities of the voxels render multiple objects simultaneously via a transparent effect. Thus, for example, surface rendering 303 is an extension of volume rendering 304 with an opacity equal to one. The colors of voxels are used to distinguish the kinds of objects to be rendered simultaneously. Using opacities and colors of voxels, the objects are rendered in 3-D by a composite ray-tracing algorithm. The composite ray-tracing algorithm used in VR 304 is based on the theory of physics of light transportation in the case of neglecting scattering and frequency effects. VR 304 is known as a method for visualizing thin and detailed objects and suitable for good transparent effects. But VR 304 uses whole volume data, so the volume rendering speed is relatively low due to the expensive computation.

A Maximum Intensity Projection (MIP) 305 which is a visualization technique that is realized by a simple ray-tracing algorithm. MIP 305 uses the intensity volume data directly without preprocessing of any volume data. The ray traverses the voxels and the only maximum voxel value is retained on the projection plane perpendicular to the ray. Similar to VR 304, the resampling of voxel intensities at the new voxel locations according to the viewing direction is also needed before ray-tracing can be performed. MIP 305 is a good visualization method, especially for vessel structures. But MIP 305 discards the information of depth while transforming 3-D data to 2-D data that results in an ambiguity of geometry of an object in the MIP 305 images. But, this ambiguity can be solved, for example, by showing MIP 305 images at several different angles in a short sequential movie.

At 306, if the rendered image is not sufficiently detailed enough to determine if any objects within the bag are threats in order to accept or reject the bag, the unpacking process is repeated with a new set of rendering parameters. The new rendering parameters may include, for example, the opacity and coloring scheme for volume rendering 304 and lighting conditions for surface rendering 303, a new rendering region, orientation of the viewpoint, and the like. For instance, the rendered image as displayed to the customs official 26 may simultaneously co-display at least one of a surface and volume rendered view of the content of the piece of baggage, and an enlarged image of a region of interest from the rendered view. The customs official 26 may zoom on a region of interest within the rendered view or may rotate the rendered view to display the content of the piece of baggage from a new viewpoint.

At 307, the customs official 26 decides whether one or more threat objects exist within the packed bag. In an embodiment, an automatic threat detection analysis of at least a portion of the volumetric data set based on the scannable characteristic is performed. During electronic unpacking 104, the surface rendering 303 and volume rendering 304 process visit all the voxels within the 3-D dataset, where each voxel is classified into one of several categories, such as innocuous, organic, steel, and the like. The voxel is categorized based on the Hounsfield unit value of the voxel. Low Hounsfield unit values correspond to voxels for air or water and are classified as innocuous; medium Hounsfield unit values correspond to voxels classified as organic material (e.g., shampoo or explosives); and high Hounsfield unit values correspond to voxels classified as aluminum or steel (e.g., for guns or knives). Once the classification marking is completed and 3-D views are generated. The volume data is initially segmented by determining the edges and borders of an object by connecting together voxels having similar Hounsfield unit values in common. For example, the voxels are connected together using a 3D connectivity algorithm as known in the art, such as the marching-cubes algorithm or a 3D region growing algorithm. Furthermore, by taking the average of each of the connected voxels and utilizing a known smoothing algorithm a surface is provided.

Upon completion of the segmentation, the volume rendered 304 images are compared against the segmented regions for consistency, and the initial segmentation is modified in accordance. The rendered views are generated using a portion of the 3D data to render a particular object (e.g., the threat) or objects within the packed bad, and to discard obstructing structures to clearly render the object of interest (e.g., the threat). Once the final segmentation is completed, the detected threat objects are automatically indicated with ellipsoids on the 3D rendered images for the customs official 26. By combining volume rendering 304 with segmentation, the threats (e.g., explosive stimulants) are clearly visible and identified. The rendered views of the threats may be shared across the network 24.

Based on the customs officials 26 experience, perhaps aided by a remote expert 30 through the Expert-on-Demand service, the decision is made whether to accept 308 or reject 309 the bag in question. At 310, once the final decision is made, the inspection completes and the customs official 26 is presented with the next bag.

FIG. 4 illustrates an exemplary process for electronic unpacking 200 of a piece of luggage. The unpacking begins with a surface rendering of the entire bag 202 as shown in FIG. 4(a). The initial surface rendering with a portion of the bag 202 peeled (i.e., unpacked) shows the radio 204 packed within the bag 202 as shown in FIG. 4(b). The surface rendering of the radio 202 is shown in FIG. 4(c). To view a structure within the radio 202, the CT raw scan data is volume rendered with color transparencies as shown in FIGS. 4 (d), 4(e), and 4(f). Clearly visible due to the different transparencies for different objects are two speakers 206, a pack of batteries 208, and two six-ounce explosive stimulants 210 (e.g., as soap bars) that are hidden underneath the right speaker. The detected explosives 210 will be clearly marked for the customs officials 26 benefit as shown in FIG. 4(g). The views (e.g., FIGS. 4(d) through 4(f)) can be displayed in a continuous 3-D display that rotates for the custom's official 26 to examine. Finally, the customs official 26 may want to zoom in on the possible explosive stimulants 210 underneath the right speaker 206 as shown in FIGS. 4(g), 4(h), and 4(i).

Figure 4A:
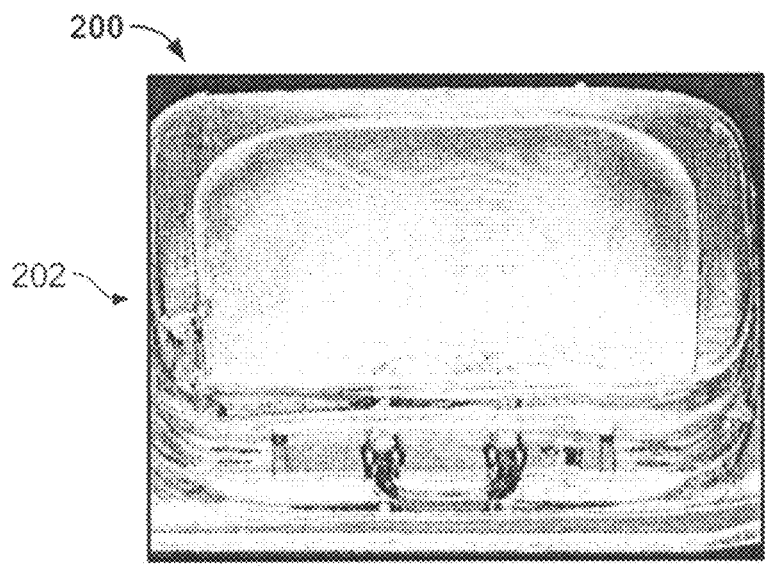
FIGS. 4A-4I illustrate screen shots for a display at a local screener's terminal containing an exemplary data set of scanned images formed in accordance with an embodiment of the invention.
Figure 4B:
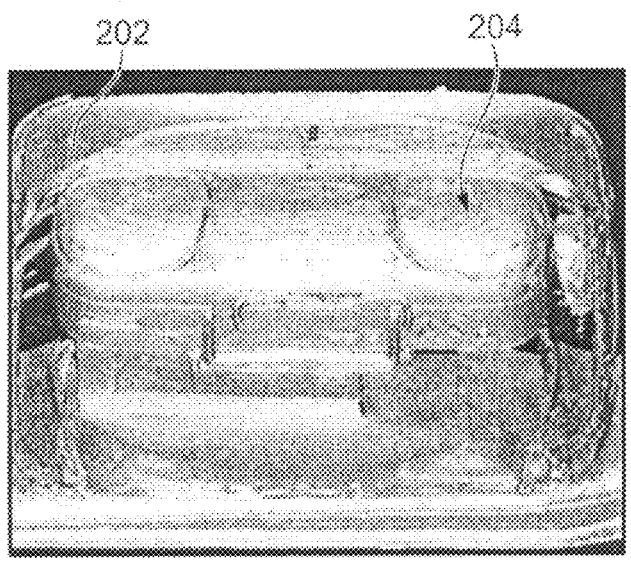
Figure 4C:
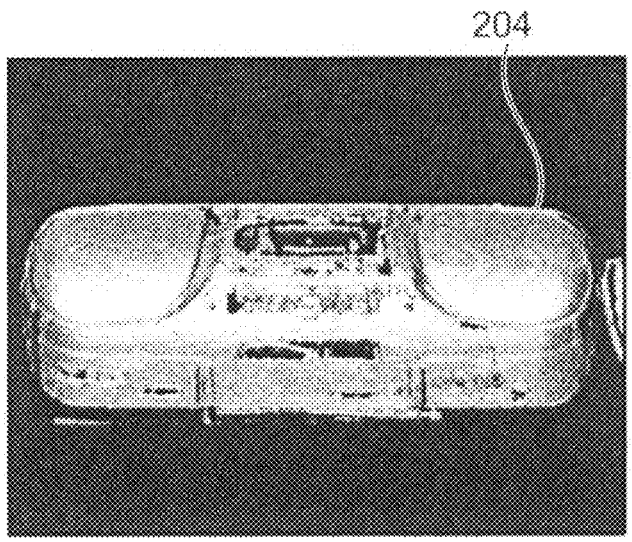
Figure 4D:
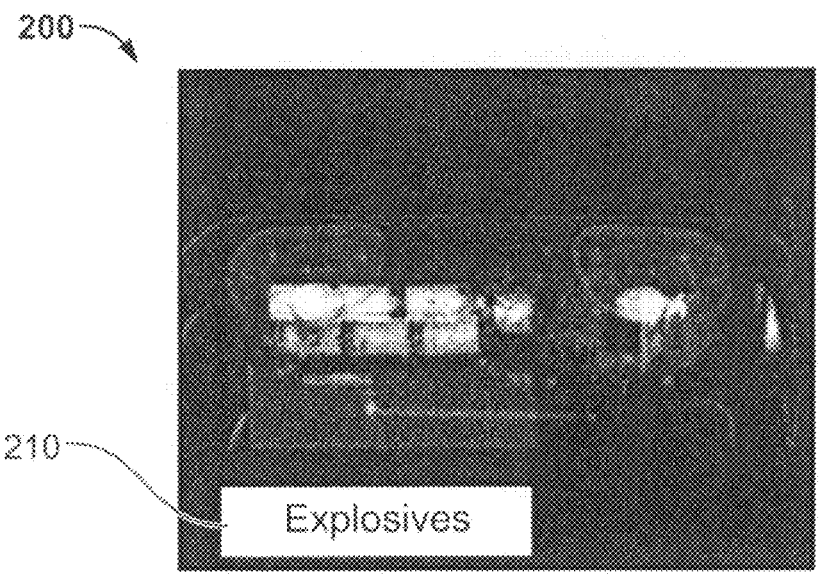
Figure 4E:
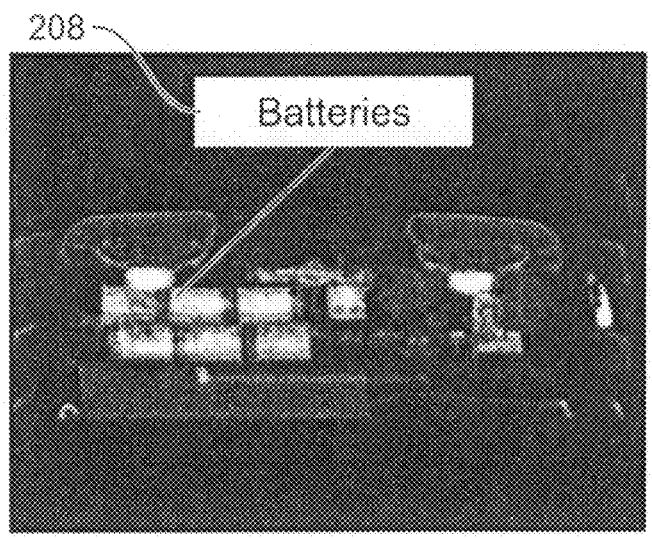
Figure 4F:
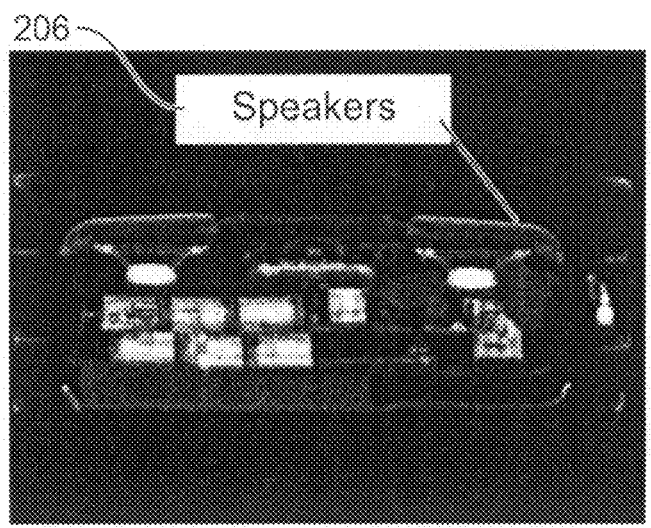
Figure 4G:
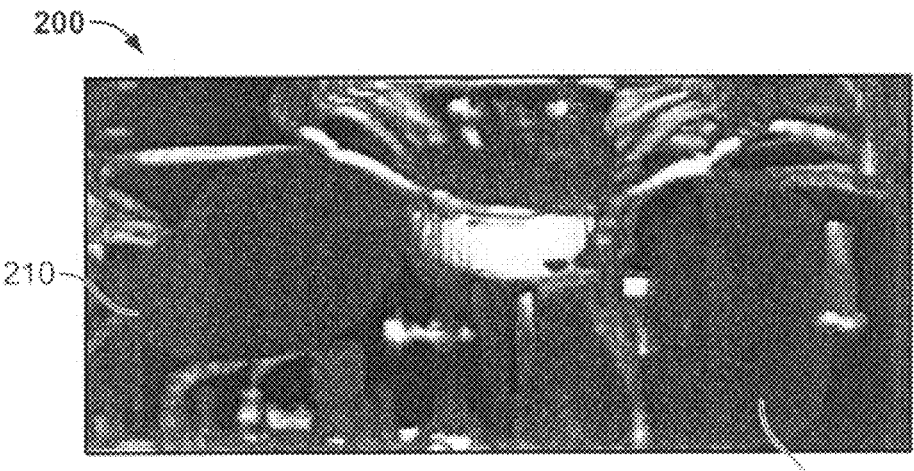
Figure 4H:
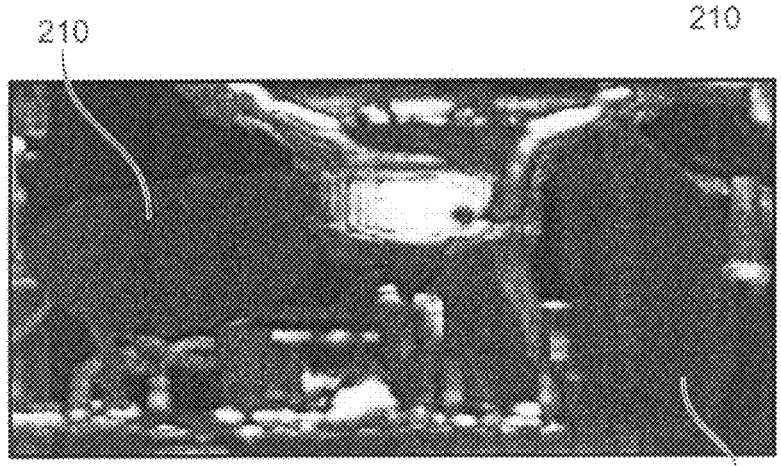
Figure 4I:
Figure 5:
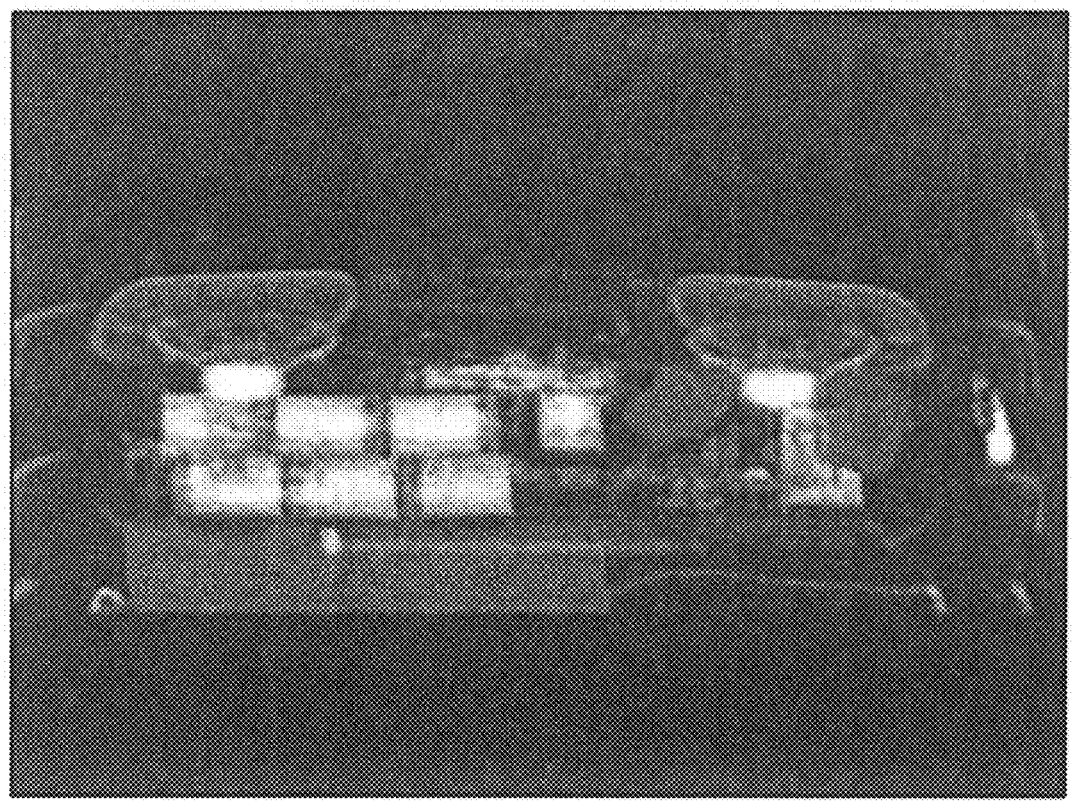
FIG. 5 illustrates a screen shot for a display at a local screener's terminal containing a data set of scanned images of a suitcase and a radio containing simulated explosives show in FIG. 5 formed in accordance with an embodiment of the invention.

FIG. 5 illustrates a high resolution 3-D view of the image of the radio 204 (shown in FIG. 4(e)). In an exemplary embodiment, the 3-D views (shown in FIG. 4) may be in color and the detected explosives may be displayed in a shade of orange with an ellipsoid surrounding the explosives. The customs official 26 is able to rotate, zoom and localize these 3-D views as necessary, with or without the assistance of a remote expert 30 in resolving the suspect bag. In addition, the customs official 26 may also utilize some measurement tools (e.g., such as distance/volume) to determine whether an object is a threat.

Figure 6:
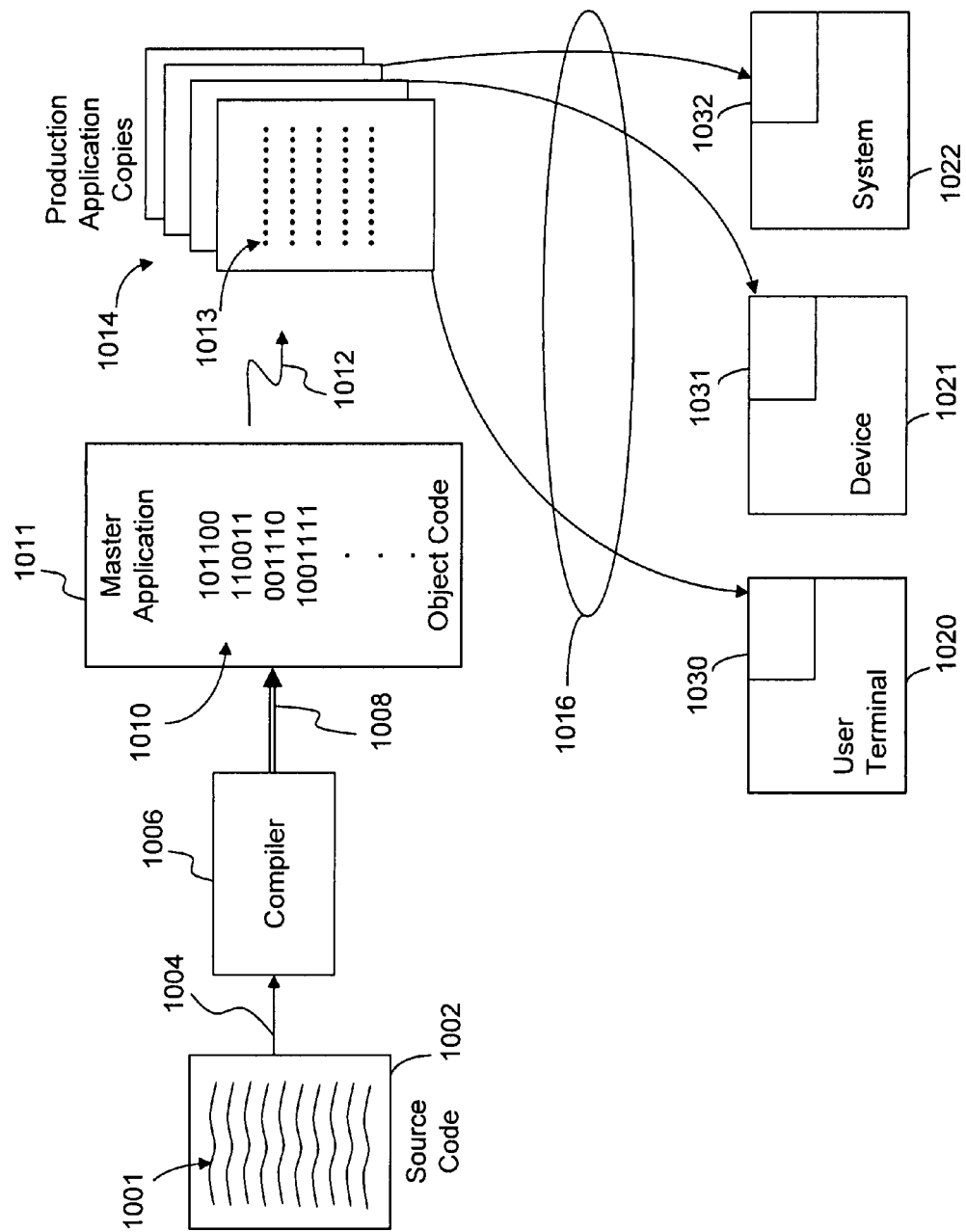
FIG. 6 illustrates a block diagram of exemplary manners in which embodiments of the present invention may be stored, distributed and installed on computer readable medium.

In the above examples, the scanners 16 are described in connection with CT and DI scanners and the raw data sets are described in connection with attenuation measurement data. For instance the scanners 16 may include a cine computed tomography scanner, a helical CT scanner, a dual-energy x-ray scanner, dual-energy CT scanner, and a four-dimensional (4-D) cine computed tomography scan. However, alternatively other types of scanners 16 and other types of raw data may be obtained, processed and displayed without departing from the meets and bounds of the present invention. For example, the scanner 16 may represent an electron beam scanner. Alternatively, the scanner 16 may transmit and receive non-x-ray forms of energy, such as electromagnetic waves, microwaves ultraviolet waves, ultrasound waves, radio frequency waves and the like. Similarly, in the above described embodiments, the raw data set is representative of attenuation measurements taken at various detector positions and projection angles, while the object is stationary within the scanner 16 or while the object is continuously moving through the scanner 16 (e.g., helical or spiral scanning). Alternatively, when non-x-ray forms of energy are used, the raw data set may represent non-attenuation characteristics of the object. For example, the raw data may represent an energy response or signature associated with the object and/or the content of the object, wherein different types of objects may exhibit unique energy responses or signatures. For example, explosives, biological agents, and other potentially threatening medium, may exhibit unique electromagnetic responses when exposed to certain fields, waves, pulse sequences and the like. The electromagnetic response of the object and the content of the object are recorded by the scanner 16 as raw scan data stored in the database 12. As a further example, the scanner 16 may be used to obtain finger prints from the object. The finger prints would be recorded as scan data in the database 12. FIG. 6 illustrates a block diagram of exemplary manners in which embodiments of the present invention may be stored, distributed and installed on computer readable medium. In FIG. 6, the "application" represents one or more of the methods and process operations discussed above. For example, the application may represent the process carried out in connection with FIGS. 2-3 as discussed above.

As shown in FIG. 6, the application is initially generated and stored as source code 1001 on a source computer readable medium 1002. The source code 1001 is then conveyed over path 1004 and processed by a compiler 1006 to produce object code 1010. The object code 1010 is conveyed over path 1008 and saved as one or more application masters on a master computer readable medium 1011. The object code 1010 is then copied numerous types, as denoted by path 1012, to produce production application copies 1013 that are saved on separate production computer readable medium 1014. The production computer readable medium 1014 are then conveyed, as denoted by path 1016, to various systems, devices, terminals and the like. In the example of FIG. 6, a user terminal 1020, a device 1021 and a system 1022 are shown as examples of hardware components, on which the production computer readable medium 1014 are installed as applications (as denoted by 1030-1032).

The source code may be written as scripts, or in any high-level or low-level language. Examples of the source, master, and production computer readable medium 1002, 1011 and 1014 include, but are not limited to, CDROM, RAM, ROM, Flash memory, RAID drives, memory on a computer system and the like. Examples of the paths 1004, 1008, 1012, and 1016 include, but are not limited to, network paths, the internet, Bluetooth, GSM, infrared wireless LANs, HIPERLAN, 3G, satellite, and the like. The paths 1004, 1008, 1012, and 1016 may also represent public or private carrier services that transport one or more physical copies of the source, master, or production computer readable medium 1002, 1011 or 1014 between two geographic locations. The paths 1004, 1008, 1012 and 1016 may represent threads carried out by one or more processors in parallel. For example, one computer may hold the source code 1001, compiler 1006 and object code 1010. Multiple computers may operate in parallel to product the production application copies 1013. The paths 1004, 1008, 1012, and 1016 may be intra-state, inter-state, intra-country, inter-country, intra-continental, intercontinental and the like.

The operations noted in FIG. 6 may be performed in a widely distributed manner world-wide with only a portion thereof being performed in the United States. For example, the application source code 1001 may be written in the United States and saved on a source computer readable medium 1002 in the United States, but transported to another country (corresponding to path 1004) before compiling, copying and installation. Alternatively, the application source code 1001 may be written in or outside of the United States, compiled at a compiler 1006 located in the United States and saved on a master computer readable medium 1011 in the United States, but the object code 1010 transported to another country (corresponding to path 1012) before copying and installation. Alternatively, the application source code 1001 and object code 1010 may be produced in or outside of the United States, but product production application copies 1013 produced in or conveyed to the United States (e.g. as part of a staging operation) before the production application copies 1013 are installed on user terminals 1020, devices 1021, and/or systems 1022 located in or outside the United States as applications 1030-1032.

As used throughout the specification and claims, the phrases "computer readable medium" and "instructions configured to" shall refer to any one or all of i) the source computer readable medium 1002 and source code 1001, ii) the master computer readable medium and object code 1010, iii) the production computer readable medium 1014 and production application copies 1013 and/or iv) the applications 1030-1032 saved in memory in the terminal 1020, device 1021 and system 1022.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, types of materials and coatings described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A method of inspecting baggage to be transported from a location of origin to a destination, the baggage having contents stored therein, comprising:
   generating scan data representative of the baggage and the contents while the baggage is at the location of origin;
   storing the scan data in a database;
   displaying a three-dimensional (3D) rendering of the contents within the baggage;
   electronically unpacking the piece of baggage; said electronically unpacking including:
      permitting a user to select an item in the baggage contents;
      removing the item selected by the user; and
      displaying the remaining contents within the baggage to enable the user to visually observe a 3D rendering of the contents remaining within the baggage;
   permitting a user to identify at least one object of interest of the contents remaining within the baggage as either a contraband or a non-contraband item;
   automatically categorizing the object of interest as an innocuous material, an organic material, or a metallic material based on a scannable characteristic;
   producing an image view representative of the object of interest, the image view based on the scan data retrieved from the database over a network; and
   presenting the image view at the destination.

2. The method of claim 1, wherein generating and storing the scan data occurs before the baggage is transported from the location of origin.

3. The method of claim 1, wherein the scan data is generated by a CT scanner having a moving source and detector.

4. The method of claim 1, wherein presenting the image view occurs after the baggage is transported from the location of origin.

5. The method of claim 1, wherein the scan data defines a volume of interest and the scannable characteristic is an attenuation measurement.

6. The method of claim 1, wherein the scan data comprises raw volumetric data representing voxels within an object contained within the baggage, each voxel having a Hounsfield unit value, and wherein the scannable characteristic is an attenuation measurement and comprises at least one of a surface and an edge of at least the baggage and objects contained within the baggage.

7. The method of claim 1 further comprising obtaining passenger information and a flight manifest and associating the passenger information with the scan data of the baggage based on the flight manifest.

8. The method of claim 1, further comprising storing in the database at least one of a name of the passenger assigned to the baggage, an identity of the piece of baggage containing the object of interest, a location of the object of interest within the baggage, a type of object of interest, a category of the object of interest, and a volume of the object of interest.

9. The method of claim 1, wherein the image view is displayed at the destination between a time when the baggage is checked, the baggage is transported to a flight, a time in flight, and a time at which the baggage is transported from the flight to a baggage retrieval area at the destination.

10. The method of claim 1, wherein the image view is accessed by a user and an expert screener across the network.

11. The method of claim 1, wherein the image view comprises a volume rendering of the object of interest, the volume rendering utilizing one or more colors and opacity values.

12. A system for inspecting baggage transported from a location of origin to a destination, the baggage having contents stored therein, said system comprising:
   a database to store scan data acquired while scanning a piece of baggage while the baggage is at the location of origin;
   a network interface configured to communicate with a network to obtain the scan data from the data base; and
   a workstation, located at the destination, for;
   displaying a three-dimensional (3D) rendering of the contents within the baggage;
   electronically unpacking the piece of baggage, said unpacking comprising;
      permitting a user to select an item in the baggage contents;
      removing the item selected by the user; and
      displaying the remaining contents within the baggage to enable the user to visually observe a 3D rendering of the contents remaining within the baggage;
   permitting a user to identify at least one object of interest of the contents remaining within the baggage as either a contraband or a non-contraband item;
   automatically categorizing the object of interest as an innocuous material, an organic material, or a metallic material based on a scannable characteristic; and
   producing an image view of a content of the baggage at the destination.

13. The system according to claim 12, further comprising a scanner configured to scan the baggage at a location of origin, the scanner comprises at least one of a computed tomography (CT) scanner, a cine computed tomography scanner, a helical CT scanner, a four-dimensional (4D) cine computed tomography scanner, an electronic beam scanner, a diffraction imaging (DI) scanner, an X-ray scanner, a dual-energy x-ray scanner, and a dual-energy CT scanner.

14. The system according to claim 12, wherein the network interface is configured to communicate with at least one of a private network, a high-speed network, an intranet, a local area network, a wide area network, a peer-to-peer network, a client/server network, metropolitan area network, and an interne.

15. The system according to claim 12, further comprising multiple remote display terminals to simultaneously present the image view to users at multiple locations.

16. The system according to claim 12, wherein the scan data comprises an image file, the image file includes at least one of a header identifying a scanning device, a time the scan was taken, and an identification of a passenger.

17. The system according to claim 12, wherein the image view includes pre-sorted sequences of the rendered images stored in the database.

18. The system according to claim 12, wherein the object of interest is identified on the image view with a marking and the marking is stored in the database.

19. The system according to claim 18, wherein the workstation categorizes the object of interest as at least one of an innocuous material, an organic material, and a metallic material based on a Hounsfield unit value.

20. A non-transitory computer readable medium storing an application for use to inspect baggage that is transported from a location of origin to a destination, where scan data has been generated that is representative of a piece of baggage while the baggage was at the location of origin, the baggage having contents stored therein, the scan data being stored at a first memory, the application comprising instructions configured to direct a computer to:
obtain the scan data from the first memory;
produce an image view representative of the contents within the baggage, the image view being based on the scan data retrieved from the first memory;
electronically unpack the piece of baggage, said unpacking comprising:
permitting a user to select an item in the baggage contents;
removing the item selected by the user; and
displaying the remaining contents within the baggage to enable the user to visually observe a 3D rendering of the contents remaining within the baggage;
permitting a user to identify at least one object of interest of the contents remaining within the baggage as either a contraband or a non-contraband item; and
present an image of the object of interest on a display located at the destination.

21. The non-transitory computer readable medium of claim 20, wherein the scan data was generated and stored before the baggage was transported from the location of origin.

22. The non-transitory computer readable medium of claim 20, wherein the scan data constitutes a volumetric data set generated by a CT scanner, the instructions directing the computer to render a 3D view of an object of interest in the baggage.

23. The non-transitory computer readable medium of claim 20, wherein the scan data constitutes a projection data set generated by an x-ray scanner having a stationary source and detector, the instructions directing the computer to produce a 2D projection view of an object of interest in the baggage.

24. The non-transitory computer readable medium of claim 20, wherein the scan data constitutes a volumetric data set generated by a CT scanner, the instructions directing the computer to automatically identifying an object of interest in the image view based on attenuation measurements in the scan data.

25. The method of claim 1, further comprising automatically segmenting the scan data to generate an image of at least one of the innocuous material, the organic material, or the metallic material.

26. The method of claim 1, further comprising:
utilizing a drawing function to manually outline the contraband item;
generating an image of the contraband item that includes the outline of the contraband item; and
presenting the image view of only the outlined contraband item at the destination.

27. The method of claim 26, further comprising:
determining a volume of each of the contraband items in the piece of baggage; and
segmenting the objects to identify the contraband item.

28. The method of claim 1, further comprising:
manually performing measurements of the contraband item; and
determining a volume of the contraband item based on the measurements.

29. The method of claim 1, further comprising:
marking the image view to identify the contraband item; and
utilizing the marking to cut-out portions of the image view that do not represent the contraband item.

30. The method of claim 1 further comprising:
electronically unpacking the piece of baggage to remove the scan data representing a surface of the baggage; and
displaying the three-dimensional surface rendering of the contents within the baggage with a visual representation of the surface of the baggage removed.

31. The method of claim 1, wherein the user selects the item from the 3D rendering.

32. The method of claim 1, wherein the user selects the object of interest from the 3D rendering.

33. The method of claim 1, wherein removing the selected item includes segmenting the scan data into object segments associated with individual items within the baggage.

34. The method of claim 1, wherein permitting a user to select an item in the baggage contents further comprises:
permitting a user to select an item in the baggage contents that is not contraband; and
discarding the selected item from the 3D rendering.

35. The method of claim 1, further comprising:
permitting a user to toggle the selected item on and off such that the selected item is either displayed on the 3D rendering or removed from the 3D rendering.

36. The method of claim 1, further comprising:
segmenting the scan data to generate the 3D rendering of the contents within the baggage; and
outlining the edges of the contents based on the segmentation to enable the user to select the item.

* * * * *